Nov. 29, 1966 I. AMES 3,288,637

EDGE PASSIVATION

Filed June 28, 1962 4 Sheets--Sheet 1

INVENTOR
IRVING AMES

BY Elmer W Galbiati

ATTORNEY

Nov. 29, 1966 I. AMES 3,288,637

EDGE PASSIVATION

Filed June 28, 1962 4 Sheets-Sheet 4

United States Patent Office 3,288,637

Patented Nov. 29, 1966

3,288,637
EDGE PASSIVATION

Irving Ames, Peekskill, N.Y., assignor to International Business Machines Corporation, New York, N.Y., a corporation of New York Filed June 28, 1962, Ser. No. 205,945
10 Claims. (Cl. 117—212)

This invention relates to cryogenic circuitry and more particularly to cryotron gating elements.

Thin film cryotrons consist of a gating element and a control element. The gating element is made of material which has a superconducting state and a resistive state and the control element is positioned so that the the magnetic field generated by current in the control element can change the gating element from the superconductive state to the resistive state. In order to obtain high performance circuitry, it is generally desirable that the gating element have a sharp magnetic transition characteristic. That is, it is desirable to have a gating element which can be changed from an entirely superconductive state to an entirely resistive state by a small amount of change in the current in the control element. The sharpness of the magnetic transition characteristics of a gating element are to a large degree dependent upon the characteristics of the edges of the gating element.

A gating element deposited through a mask has tapered edges due to shadowing. As discussed in U.S. Patent 2,989,716 by A. E. Brennemann et al. entitled "Superconductive Circuits" the transition characteristics of a gating element can be greatly improved by physically removing the edge portions of the gating element. A number of different techniques such as annealing and etching have also been used to effectively remove the edges of the gating element and thereby improve the magnetic transition characteristics. The present invention relates to an improved technique for effectively "removing" the edges of a gating element.

According to the present invention, the critical temperature of the edge portions of the gating element is lowered thereby transforming the edge portions into a nonsuperconducting material at the particular operating temperature. The edge portions of the gating element remain resistive during the transition of the gating element between superconductive and resistive states and, since they remain resistive, they have no effect upon the transition characteristics of the gating element. The critical temperature of the edge portions of the gating element is lowered by reacting them with another material.

During the operation which lowers the critical temperature of the edge portions, some means must be used to prevent the entire gate from being transformed into a nonsuperconducting material. The present invention includes several techniques for insuring that only the edge portions of the gating element are changed into a nonsuperconducting material.

Another feature of certain embodiments of the present invention is that the material which lowers the critical temperature of the edge portions of the gating element also causes the edges of the gating element to agglomerate and to break away from the main body of the gating element.

An object of the present invention is to provide an improved gating element.

Yet another object of the present invention is to provide a gating element having sharp magnetic transition characteristics.

Still another object of the present invention is to provide a relatively easy method of fabricating a gating element having sharp transition characteristics.

A still further object of the present invention is to provide a gating element exhibiting a magnetic transition characteristic which is unaffected by its edges.

A still further object of the present invention is to provide a gating element having a high critical current, low hysteresis and sharp magnetic transition characteristics.

Yet another object of the present invention is to provide an improved cross-film cryotron.

The foregoing and other features, objects and advantages of the invention will be made more apparent by the following more particular description of preferred embodiments of the invention as illustrated in the accompanying drawings.

Figure 1A:
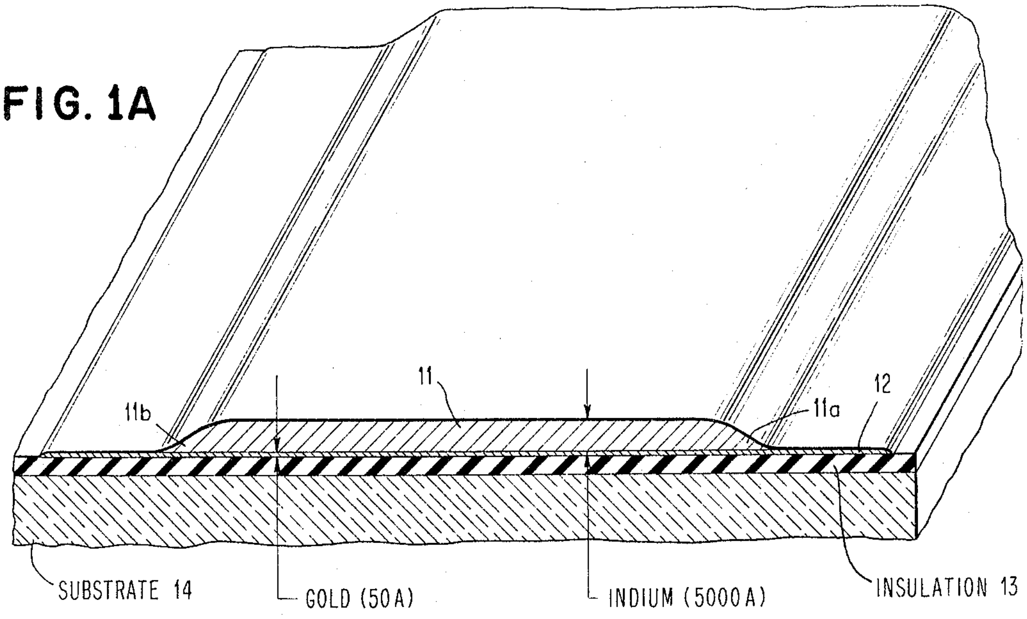
FIGURE 1A is a perspective view of a first embodiment of the invention.

The first preferred embodiment of the invention shown in FIGURE 1A includes an indium gating element 11, a thin layer of gold 12, a layer of silicon monoxide 13 and a substrate 14. Layers 11, 12 and 13 were deposited by the well-known vapor deposition technique.

When a thin film is deposited through a mask by vapor deposition in a conventional manner, shading takes place. As a result, the edges of the thin film are not vertical; instead, they are rounded and slanted. Film 11 therefore has slanted edge portions **11*a* and 11*b***. The nature and effect of the shading phenomena is described among other places in U.S. Patent 2,989,716 entitled "Superconductive Circuits" by A. E. Brennemann et al.

The above cited patent also shows that the width of the magnetic transition characteristic of a gating element is dependent to a large degree upon the character of the edges of the gating element. If a gating element has tapered edges, it has a wide magnetic transition characteristic. If the tapered edges of the gating element are removed, the gating element has a sharp magnetic transition characteristic.

There are two phenomena that give gating element 11, shown in FIGURE 1A, a sharp magnetic transition. First, the critical temperature of the tapered edges **11*a* and 11*b* is lower than the critical temperature of the thick center portion of the gating element and, second, the tapered edges, 11*a* and 11*b* are agglomerated. For reasons which will be explained in detail later, each of the above phenomena tends to have the same effect as mechanically cutting the tapered edges 11***a* and 11*b* from the center portion of gating element 11. The reason that the critical temperature of edges 11*a* and 11*b* is lower than the critical temperature of the thick center portion of gating element 11 will be explained first and then the reason that the edges 11*a* and 11*b* are agglomerated will be explained.

When a layer of one metal is deposited over a layer of a different metal, a certain amount of interaction between the layers results. The amount of interaction is dependent upon the thickness of the two layers. Hence, in the structure shown in FIGURE 1A, a greater degree of reaction takes place along the slanted edges 11*a* and 11*b* where there is a greater ratio of gold to indium. The exact nature of reaction between two metals, one of which is deposited on top of the other, is very complex. The exact nature of the interaction between the layers need not be understood to understand the present invention, hence, for simplicity the complex interaction between the layers will herein be termed alloying and diffusion.

Figure 1B:
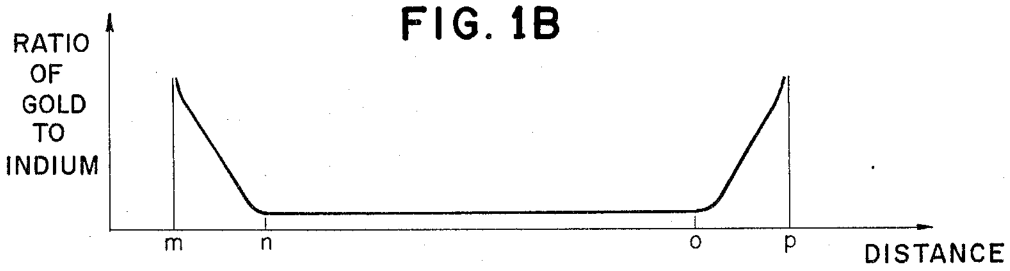
FIGURE 1B is a graph showing the composition of the gating element shown in FIGURE 1A.

FIGURE 1B is a graph showing the composition of layer 11. It shows the percentage of gold to indium as a function of the distance across layer 11. Percentage-wise, edges 11*a* and 11*b* have a greater amount of gold. The thinnest portion of the edges has the highest percentage of gold. The horizontal axis in FIGURE 1B between points *m* and *n* represents edge 11*b* and the horizontal axis between points *o* and *p* represents edge 11*a*.

The critical temperature of indium is reduced by reacting (herein termed alloying) it with gold. The amount of reduction depends upon the percentage of gold to indium. There is a greater reduction in critical temperature where there is a higher percentage of gold to indium. Hence, the structure shown in FIGURE 1 can be operated at a temperature such that the tapered edges 11*a* and 11*b* of gating element 11 remain resistive while the thick center portion of gating element 11 is switched from the superconductive state to the resistive state by the application of magnetic field. The result is that the tapered edge portions 11*a* and 11*b* have a minimal effect upon the magnetic transition characteristic of the gating element and this sharpens the characteristic..

The reason that the edge portions 11*a* and 11*b* are agglomerated and how this affects the magnetic transition of the gating element will now be explained. A layer of indium which is deposited over a layer of gold (the thickness of which exceeds a certain minimum amount) tends to agglomerate. Particularly that portion of the indium which is near the gold tends to break up into separate globules. A relatively thin layer of indium deposited over a layer of gold breaks up into separate globules becoming discontinuous and effectively a nonconductor. If a relatively thick layer of indium is deposited over a layer of gold, that portion of the indium near the gold is discontinuous; however, the upper portion of the indium is continuous and it connects the separate globules into a continuous film. This effect is explained in more detail in Patent No. 3,239,374, which issued March 8, 1966 entitled "Thin Film Circuitry" by I. Ames et al. which is assigned to the assignee of the present invention.

The tapered edge portions 11*a* and 11*b* of layer 11 are agglomerated and composed of globules of indium, that is, they are discontinuous since these tapered portions are relatively thin. However, the center portion of layer 11 is continuous since it is relatively thick. Due to the agglomeration, a certain part of edge portions 11*a* and 11*b* is broken away from the thick center portion of layer 11 with substantially the same affect as if this part of edge portions 11*a* and 11*b* were mechanically cut away from the center portion of layer 11. Hence, the agglomeration of the edge portions 11*a* and 11*b* helps to give the gating element a sharp magnetic transition characteristic.

The two effects described above, that is, the decrease in the critical temperature of edges 11*a* and 11*b* due to the interaction (herein termed alloying and diffusion) of layers 11 and 12 and the agglomeration of edges 11*a* and 11*b* give gating element 11 a sharp magnetic transition characteristic.

The critical current of gating element 11, (i.e., the amount of current in gating element 11 needed to make it resistive when there is no externally applied magnetic field) can be increased and the magnetic hysteresis of the gating element can be decreased by depositing the layer of indium 11 in the presence of a small amount of oxygen as described in Patent No. 3,239,375, issued March 8, 1966 entitled "Method of Fabricating High Gain Cryotrons" by I. Ames, which is assigned to the assignee of the present invention.

The element shown in FIGURE 1A may, for example, be the gating element for an in-line cryotron and have the following parameters:

(a) Thickness of indium layer 11: 5,000 angstroms
(b) Width of indium layer 11: 6 mils
(c) Thickness of gold layer 12: 50 angstroms
(d) Width of layer 12: The actual width of layer 12 is not important; however, it must be wider than layer 11.
(e) Operating temperature: ninety-five percent of the temperature required to make the entire gating element resistive.
(f) Deposition rate of indium: 60 angstroms per second.
(g) Conditions under which indium is deposited: Vacuum of $10^{-6}$ Torr (no oxygen added).

For the structure shown in FIGURE 1A, the width of the magnetic transition (at one milliampere of sense current) is approximately two percent of the critical magnetic field. For a similar gating element the edges of which are not passivated (or removed), the width of the magnetic transition at one milliampere of sense current would be over fifty percent.

Figure 11:
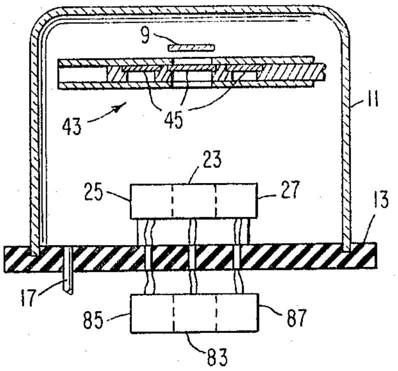
FIGURE 11 shows a vapor deposition system for fabricating an improved gating element in accordance with this invention.

The length of gating element 11 is not relevant to the present invention. Its length would depend upon the particular circuitry wherein it is being used. The method and apparatus for depositing conductors by vapor deposition techniques is well known in the art. For example, apparatus which can be used to deposit thin film elements is shown and described in copending application Serial No. 135,920 filed September 5, 1961 by J. Priest and H. L. Caswell entitled "Method for Depositing Silicon Monoxide Films" which is assigned to the assignee of the present invention. An apparatus for depositing conductors by vapor deposition is shown in FIG. 11 and is essentially that apparatus shown in the above-identified J. Priest et al. patent application, similar reference characters being employed to designate corresponding structures. Such apparatus may comprise a bell jar 11 which is evacuated along exhaust pipe 17 connected to an efficient high vacuum pump. Evaporants to be condensed and deposited onto substrate 9 are supplied from sources 23, 25, and 27, each of which contain suitable evaporant material and are supported on base plate 13 in substantial vertical alignment with substrate 9. A masking arrangement 43 is provided for selectively positioning any one of a number of pattern defining masks 45 between evaporant sources 23, 25, 27 and substrate 9 whereby superimposed configurations of condensates from the evaporant sources are formed on the substrate. Evaporant sources 23, 25, and 27 may be individually energized, in turn, by means of temperature regulators 83, 85, and 87, respectively, whereby evaporant materials contained in each may be deposited as successive layers and onto substrate 9.

Figure 2:
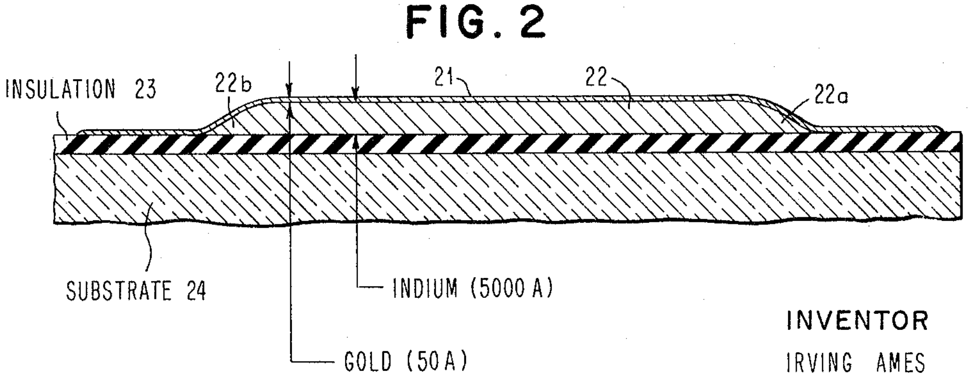
FIGURE 2 is a cross sectional view of a second embodiment of the invention.

FIGURE 2 shows in cross section a second embodiment of the invention. It includes an indium gating element 22 covered by a layer of gold 21. Layers 21 and 22 are deposited over a layer of silicon monoxide which is deposited on a substrate 24. The difference between the first and second embodiment of the invention is that in the first embodiment of the invention the layer of gold was positioned beneath the layer of indium whereas in the second embodiment of the invention the layer of gold is positioned over the layer of indium.

In FIG. 1A, there are two effects which tended to give gating element 11 a sharp magnetic transition. This is, the critical temperature of edge portions 11*a* and 11*b* was lowered and the edge portions 11*a* and 11*b* were agglomerated. In the second embodiment of the invention shown in FIGURE 2, the layer of gold 21 does not tend to agglomerate the indium 22 since it is deposited after the indium was deposited. However, the gold layer 21 reacts with the indium layer 22 in the same manner as explained with reference to the structure shown in FIGURE 1. Hence, the gating element 22 shown in FIGURE 2 does have a sharp magnetic transition due to the fact that there is a higher percentage of gold in edge portions 22*a* and 22*b* and this increased concentration of gold lowers the critical temperature of the edge portions 22*a* and 22*b* so that these edge portions remain resistive during the operation of the gating element. The result is that the gating element has a sharp magnetic transition.

Figure 3:
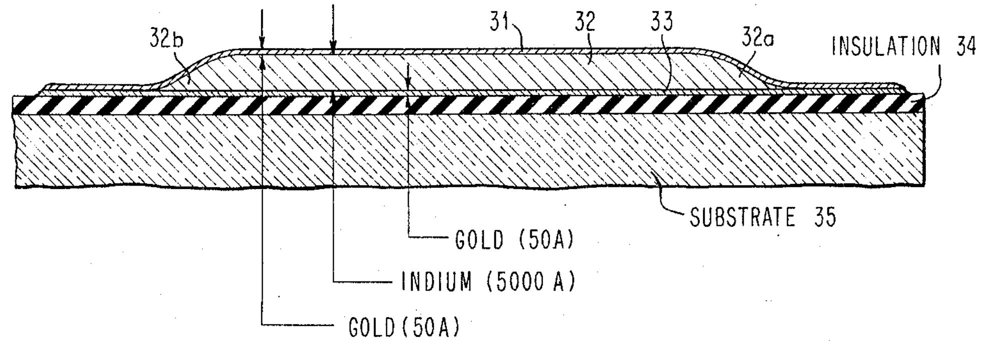
FIGURE 3 is a cross sectional view of a third embodiment of the invention.

A third embodiment of the invention is shown in FIGURE 3. It includes a layer of indium 32 with a layer of gold 31 on the top and a layer of gold 33 on the bottom. Layers 31, 32 and 33 are deposited on a layer of silicon monoxide 34 which in turn is deposited on a substrate 35. Gating element 32 is a combination of the first and second embodiment of the invention. The edge portions 32*a* and 32*b* are agglomerated due to the layer of gold 33 and they have a lower critical temperature due to both the layer of gold on top and the layer of gold on the bottom. By depositing gold both on top and on the bottom of the layer of indium the percentage of gold to indium in the thin portion of edges 32*a* and 32*b* can be increased. However, the percentage of gold in the thick center portion of layer 32 is also increased.

Figure 4:
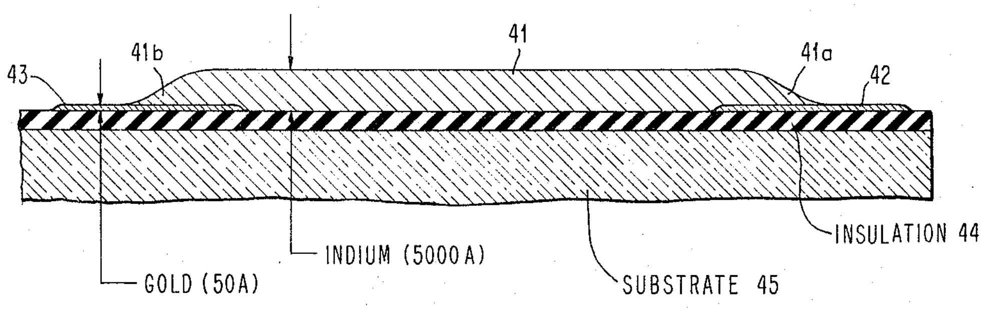
FIGURE 4 is a cross sectional view of a fourth embodiment of the invention.

A fourth embodiment of the invention is shown in FIGURE 4. It consists of a layer of indium 41 and two narrow layers of gold 42 and 43. In the previous embodiments of the invention, some gold alloyed into the entire center portion of the gating element and, hence, the critical temperature of the entire gating element was lowered to a small extent.

In the structure shown in FIGURE 4, tapered edges 41*a* and 41*b* have a lower critical temperature and they are agglomerated due to gold layers 42 and 43. However, the center portion of layer 41 is entirely unaffected. Gating element 41 has substantially the small critical temperature of pure indium which is a slightly higher critical temperature than the gating elements shown in FIGURES 1A, 2 and 3. However, it is difficult to fabricate gating element 41 since it is difficult to exactly position the layers 42 and 43 beneath the tapered edges of layer 41. Gold layers 42 and 43 need not be narrow since they can extend beyond layer 41; however, they must be correctly positioned so that they do not extend into the center portion of layer 41.

Figure 5:
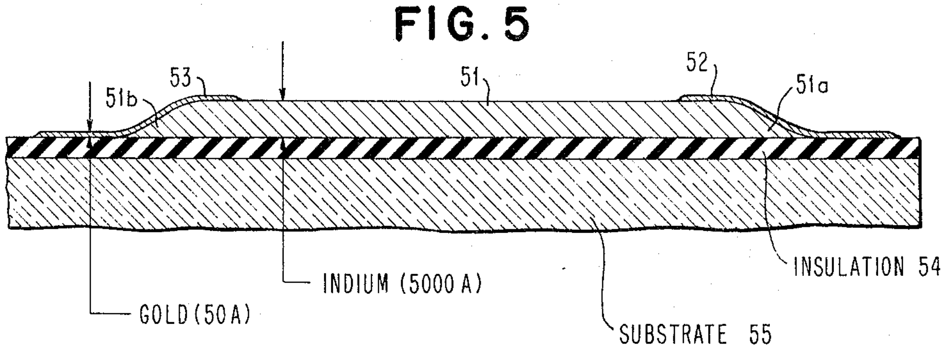
FIGURE 5 is a cross sectional view of a fifth embodiment of the invention.

FIGURE 5 shows a gating element 51 which is similar to gating element 41 except that layers 52 and 53 are positioned on top of the tapered edges 51*a* and 51*b* instead of beneath the tapered edges 51*a* and 51*b*. In the structure shown in FIGURE 5, the edges 51*a* and 51*b* have their critical temperature lowered due to the gold layers 52 and 53; however, there is no agglomeration of edges 51*a* and 51*b* due to the gold.

Figure 6:
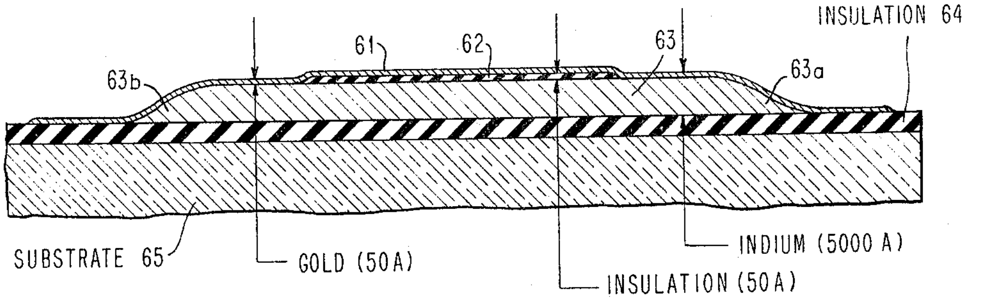
FIGURE 6 is a cross sectional view of a sixth embodiment of the invention.

A sixth embodiment of the invention is shown in FIGURE 6. It includes a layer of gold 61 and a layer of silicon monoxide insulating material 62, a layer of indium 63, a second layer of silicon monoxide 64 and a substrate 65. The layer of silicon monoxide 62 prevents gold in layer 61 from contaminating the center portion of layer 63. The structure shown in FIGURE 6 is fabricated by first depositing silicon monoxide layer 64, next depositing indium layer 63 through a mask, then covering the center portion of layer 63 with insulating material 62 by depositing the layer of insulating material 62 through a mask which has a narrower slot therein than the mask used to deposit layer 63. In this manner the edges of layer 63 are exposed. Then gold layer 61 is deposited over layers 62 and 63. Gold layer 61 only contacts the end portions of layer 63 and, hence, the critical temperature of the edge portions of layer 63 is reduced while the center portion of layer 63 remains unaffected by the gold 61. Layer 62 need not be an electrical insulating material since its only function is to prevent layer 61 from reacting with layer 63.

Figure 7:
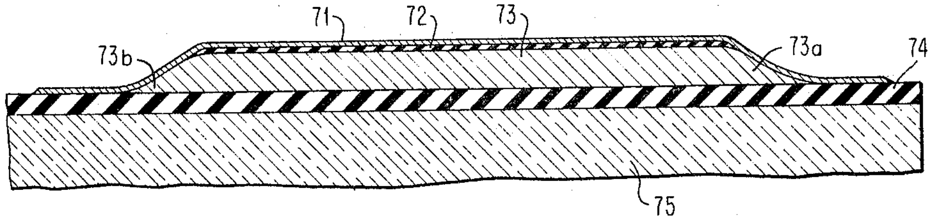
FIGURE 7 is a cross sectional view of a seventh embodiment of the invention.

A seventh embodiment of the invention is shown in FIGURE 7. The seventh embodiment of the invention is similar to the sixth embodiment shown in FIGURE 6. In the embodiment of the invention shown in FIGURE 6 insulating layer 62 was deposited through a mask having a narrower slot than the mask used to deposit layer 63. In the structure shown in FIGURE 7, the same mask was used to deposit layers 72 and 73. When layer 72 was deposited, the source of the evaporant was moved farther from the mask; hence, the layer 72 has less shadowing than layer 73, and the tapered edge portions 73*a* and 73*b* not covered by insulating layer 72 are exposed to the gold layer 71. The advantage of using the same mask to deposit both layers 72 and 73 is that a smaller portion of layer 73 is exposed to the gold layer 71, However, the beneficial effects of the gold layer 71 are not decreased since the tapered edges 73*a* and 73*b* are still exposed to gold layer 73. The difference in shadowing is also due to the fact that layer 72 is much thinner than layer 73. Hence, the tapered edges of layer 72 are much smaller.

For the structure shown in FIGURE 7, the source of the evaporant was positioned eight inches from the mask during the deposition of layer 73 and was positioned nine inches from the mask during the deposition of layer 72. Furthermore, an orifice at the source of the evaporant which was half the size of that used for the deposition of layer 73 was used. Changing either the distance from the mask to the orifice or changing the size of the mask, in effect, changes the solid angle which the orifice of the source subtends at the mask.

Figure 8:
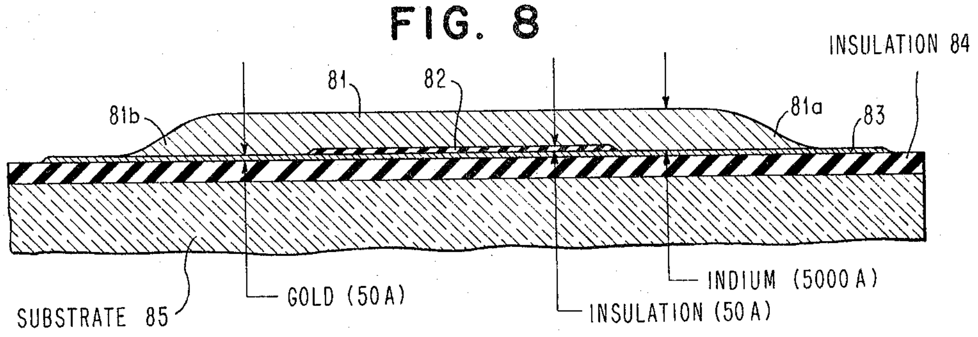
FIGURE 8 is a cross sectional view of an eighth embodiment of the invention.

An eighth embodiment of the invention is shown in FIGURE 8. The eighth embodiment of the invention includes an indium layer 81, a layer of insulating material 82, a gold layer 83, a second layer of insulating material 84 and a substrate 85. The insulating material 82 was deposited through a mask having a relatively narrow slot and layer 81 was deposited through a mask having a relatively wide slot. The result is that edge portions 81*a* and 81*b* are not separated from gold layer 83 by insulating layer 82 and, hence, the critical temperature of edge portions 81*a* and 81*b* is reduced edge portions 81*a* and 81*b* are agglomerated as previously described.

Figure 9:
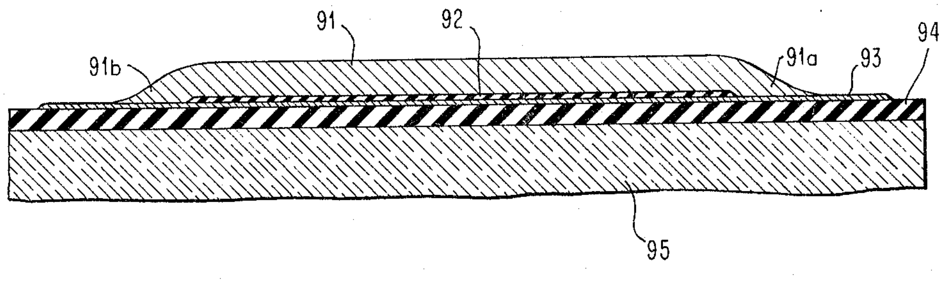
FIGURE 9 is a cross sectional view of a ninth embodiment of the invention.

A ninth embodiment of the invention is shown in FIGURE 9. It includes a layer of indium 91, a layer of insulating material 92, a layer of gold 93, a second layer of insulating material 94 and a substrate 95. In the ninth embodiment of the invention, layer of insulating material 92 and the layer of indium 91 were deposited through the same mask. However, during the deposition of insulating material 92, the solid angle subtended by the orifice of the source at the mask was more than when layer 91 was deposited. When layer 92 was deposited the source was nine inches from the mask and when layer 91 was deposited the source was eight inches from the mask. As a result, there is more shadowing in layer 91 and the tapered edges of layer 91 are not separated from gold layer 92 by insulating material. Hence, the edges 91*a* and 91*b* are passivated as previously described. The advantage of the ninth embodiment of the invention over the eighth embodiment of the invention is that a smaller portion of indium other than the tapered edges is exposed to the gold.

In FIGURES 7 and 9, an advantage of using the same mask to deposit both the gating element (i.e., layers 73 and 91) of the layer of material which is used to separate the gating element from the reactive or alloying material (i.e., layers 71 and 93) is that there is no registration problem in positioning the mask.

Instead of changing the solid angles subtended at the mask by the orifice of the source when using the same mask as previously described, the following technique may be used to fabricate the structure shown in FIGURES 6 and 7. After the gating element (i.e., layers 63 or 73) is deposited, the mask is coated relatively thickly with either the same material used to deposit the gating element or with some other material. The coating can be applied by vapor deposition. This will narrow the slot in the mask. The insulating layer 62 or 72 can then be deposited through the same mask without changing the position of the source relative to the mask.

Figure 10A:
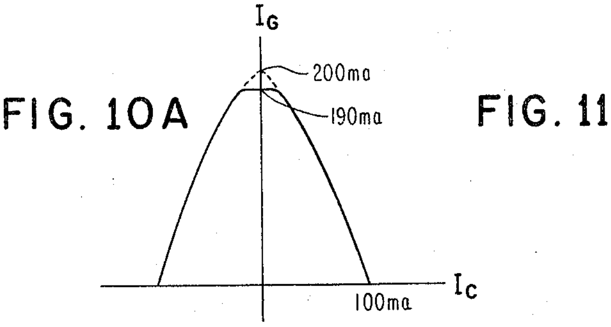
FIGURE 10A is a graph showing the switching characteristics of a cross film cryotron.
Figure 10B:
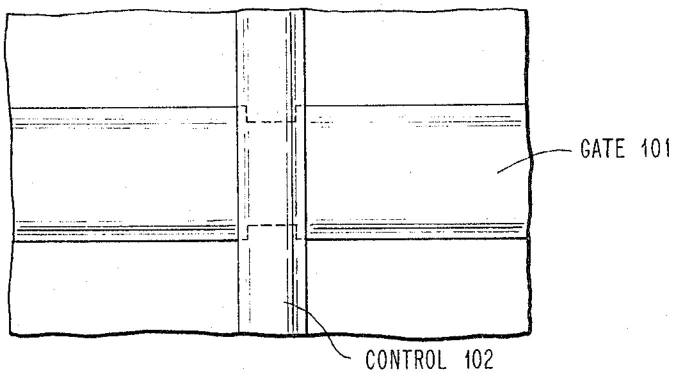
FIGURE 10B is a top view of a cross film cryotron.

The structures shown in the first nine embodiments of the invention are gating elements for in-line cryotrons; however, the present invention is also applicable to cross film cryotrons. FIGURE 10A shows (the solid line) the switching characteristics of a conventional cross film cryotron. It has been suggested that the switching characteristics of the cross film cryotron can be improved by using the type of structure shown in FIGURE 10B. The structure shown in FIGURE 10B has a gating element 101 made of a soft superconducting material and a control element 102 made of a hard superconducting material. The gating element 101 has a narrow segment underneath the control element 102. By narrowing the gating element underneath the control element the small level portion on the top of the switching characteristic is eliminated and the switching characteristic appears as shown by the dotted line in FIGURE 10A.

Figure 10C:
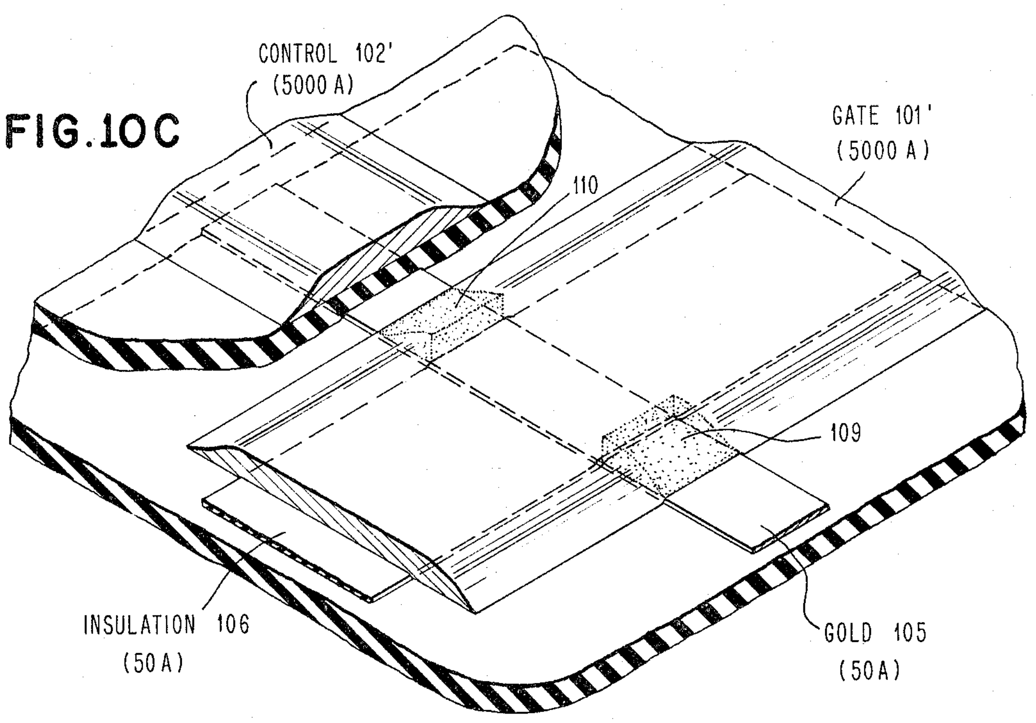
FIGURE 10C is a top view showing how the gating element shown in FIGURE 10B can be fabricated.

The technique of the present invention can be advantageously used to fabricate gating elements having a narrow portion such as gating element 101. For example, such a gating element can be fabricated as shown in FIGURE 10C. First, a layer of gold 105 is deposited, next a relatively thin layer of insulating material 106 is deposited perpendicular to the strip 105. The gate conductor 101′ is then deposited on top of the strip of insulating material 106. Insulating material 106 prevents gating element 101′ from contacting the layer of gold 105 everywhere except areas 109 and 110. In these areas, the gating element 101′ is agglomerated and the critical temperature of the gating element 101′ is decreased as previously described with reference to the other embodiments of the invention. The resulting structure is a gating element which effectively has a narrow portion. Subsequently, a second layer of insulating material 106′ and a control conductor 102′ are deposited as shown to complete the cryotron structure.

By varying the position of the gold layer 105 and insulation layer 106, all of the techniques previously described to fabricate the gating elements in the first nine embodiments of the invention can be used to fabricate the cross film gating element shown in FIGURE 10C.

Many different materials generally termed soft superconductors such as tin and tin-indium alloys can be used to fabricate gating elements. Furthermore, many different materials can be interacted with these materials in order to reduce their critical temperature. Hence, the present invention is not limited to the particular combination of metals shown herein.

It should be noted that each of the embodiments of the present invention provides a structure which (at the operating temperature) has a gating element and two resistive strips alongside of said gating element. The resistive strips are in intimate contact with the gating element along the entire length of the gating elements.

Herein, no superconducting shields are shown between the gating elements and the substrate. It should, however, be understood that such shields could be used with the gating elements of the present invention to reduce inductance as is conventional in the art. No means for maintaining an operating temperature are shown herein since such means are conventional in the art.

While the invention has been particularly shown and described with reference to preferred embodiments thereof, it will be understood by those skilled in the art that the foregoing and other changes in form and details may be made therein without departing from the spirit and scope of the invention.

What is claimed is:

1. The method of fabricating a cryotron device comprising a superconductive gating element having sharp transition characteristics comprising the steps of
   - vapor depositing a thin layer of gold having a uniform thickness, and
   - vapor depositing a gating element of indium through a mask upon said thin layer the edge portions of said gating element contacting said thin layer and being tapered,
   - a greater percentage of gold being provided adjacent said edge portions of said gating element than adjacent the center portion of said gating element whereby the critical temperature of said edge portions of said gating element is made lower than the critical temperature of said center portion of said gating element,
   - providing a control element insulated from said gating element and registered with said contacting edge portions to apply magnetic fields to said gating element.

2. The method of fabricating a cryotron device including a superconductive gating element having sharp transition characteristics comprising the steps of
   - vapor depositing a gating element of indium through a mask whereby the edge portions of said gating element are tapered,
   - vapor depositing a thin layer of gold having a uniform thickness over said gating element to contact at least the edge portions of said gating element such that the ratio of gold to indium is greater along said edge portions of said gating element,
   - the critical temperature of said edge portions of said gating element being decreased more than the critical temperature of the relatively thick center portion of said gating element, and
   - providing a control element insulated from said gating element and registered with said contacted edge portions to apply magnetic fields to said gating element.

3. A cryotron device including the method of fabricating superconductive gating a element having sharp transition characteristics comprising the steps of
   - vapor depositing a gating element of indium through a mask whereby the edge portions of said gating element are tapered,
   - vapor depositing a thin layer of gold having a uniform thickness at least over said tapered edge portions of said gating element, said gold diffusing into and alloying said gating element whereby the critical temperature of said indium is reduced,
   - said edge portions of said gating element being diffused and alloyed to a greater degree than the center portion of said gating element,
   - the critical temperature of said edge portions of said gating element being reduced below the critical temperature of said center portion of said gating element, and
   - providing a control element insulated from said gating element and registered with said diffused and alloyed edge portions to apply magnetic fields to said gating element.

4. The method of fabricating a cryotron device including a superconductive gating element having sharp transition characteristics comprising the steps of
   - vapor depositing first thin layer of gold having a uniform thickness vapor depositing a gating element of indium through a mask over said first thin layer such that said gating element has tapered edge portions contacting said first thin layer, vapor depositing a second thin layer of gold having a uniform thickness over said gating element and contacting said edge portions, the ratio of gold to indium being greater along said edge portions than along said center portion of said gating element whereby the critical temperature of said edge portions of said gating element is lower than the critical temperature of said center portion of said gating element, and providing a control element insulated from said gating element and registered with said contacting edge portions to apply magnetic fields to said gating element.

5. The method of fabricating a cryotron device including a superconductive gating element having sharp transition characteristics comprising the steps of vapor depositing two separated strips of gold, and vapor depositing a gating element of indium through a mask, said gating element having tapered edge portions, the tapered edges of said gating element being positioned under and contacting said strips of gold whereby the critical temperature along the tapered edge portions of said gating element is reduced, and providing a control element insulated from said gating element and registered with said contacting edge portions to apply magnetic fields to said gating element.

6. The method of fabricating a cryotron device including a superconductive gating element having sharp transition characteristics comprising the steps of vapor depositing two separated strips of material each of said strips of gold being of uniform thickness, vapor depositing a gating element of indium through a mask, said gating element having tapered edge portions, at least the tapered edge portions of said gating element being deposited over and contacting said strips of gold whereby the critical temperature of the tapered edge portions of said gating element is made lower than the critical temperature of the center portion of said gating element, and providing a control element insulated from said gating element and registered with said contacting edge portions to apply magnetic fields to said gating element.

7. A cryotron device including the method of fabricating a superconductive gating element having a sharp magnetic transition comprising the steps of vapor depositing a gating element of indium through a mask whereby the edge portions of said gating element are tapered and the center portion of said gating element is of substantially uniform thickness, vapor depositing a layer of insulating material over said center portion of said gating element, vapor depositing a layer of gold having a uniform thickness over said layer of insulating material and over said tapered edge portions of said gating element not covered by said layer of insulating material, said layer of gold being in contact with said tapered edge portions of said gating element thereby reducing the critical temperature of said tapered edge portions below the critical temperature of said center portion of said gating element, and providing a control element insulated from said gating element and registered with said contacted edge portions to apply magnetic fields to said gating element.

8. A cryotron device including the method of fabricating a superconductive gating element having sharp magnetic transition characteristics comprising the steps of vapor depositing a layer of gold having a uniform thickness, vapor depositing a strip of insulating material over said layer of gold, vapor depositing a gating element of indium through a mask over said strip of insulating material whereby said gating element has tapered edge portions, said gating element being wider than said strip of insulating material such that said tapered edge portions of said gating element are not separated from and contact said layer of gold and the center portion of said gating element is separated from said layer of gold by said insulating material whereby the critical temperature of said tapered edge portions of said gating element is reduced below the critical temperature of said center portion of said gating element, and providing a control element insulated from said gating element and registered with said contacted edge portions to apply magnetic fields to said gating element.

9. The method as defined in claim 7 including the further step of vapor depositing said layer of insulating material through said mask employed for vapor depositing said gating element.

10. The method as defined in claim 8 including the further step of vapor depositing said strip of insulating material through said mask employed for vapor depositing said gating element.

References Cited by the Examiner

UNITED STATES PATENTS

| | | | |
|---|---|---|---|
| 2,948,261 | 8/1960 | McGraw | 117—217 X |
| 2,989,716 | 6/1961 | Brenneman et al. | 338—32 |
| 3,001,893 | 9/1961 | Kreuchen et al. | 117—217 |
| 3,023,727 | 3/1962 | Theodoseau et al. | 117—212 |
| 3,041,209 | 6/1962 | Beggs | 117—217 |
| 3,059,196 | 10/1962 | Lentz | 338—32 |
| 3,090,023 | 5/1963 | Brennerman et al. | 338—32 |
| 3,125,688 | 3/1964 | Rogers | 338—32 |
| 3,174,124 | 3/1965 | Bremer | 338—32 |

OTHER REFERENCES

Holland, "Vacuum Deposition of Thin Films," 1956, John Wiley and Sons, pp. 203 and 257–260 relied on.

ALFRED L. LEAVITT, *Primary Examiner.*

RICHARD M. WORD, RICHARD D. NEVIUS, MURRAY KATZ, *Examiners.*

H. T. POWELL, A. GOLIAN, *Assistant Examiners.*